US008536820B2

(12) United States Patent
Keshet et al.

(10) Patent No.: US 8,536,820 B2
(45) Date of Patent: Sep. 17, 2013

(54) MODULAR ELECTRIC SOCKET ASSEMBLY AND ASSEMBLY METHOD THEREOF

(75) Inventors: Guy Keshet, Lahavim (IL); Roman Keshet, Metar (IL)

(73) Assignee: G.R. Connecton Ltd., Metar (IL)

( * ) Notice: Subject to any disclaimer, the term of this patent is extended or adjusted under 35 U.S.C. 154(b) by 11 days.

(21) Appl. No.: 13/385,050

(22) Filed: Jan. 31, 2012

(65) Prior Publication Data

US 2012/0129405 A1 May 24, 2012

(30) Foreign Application Priority Data

Aug. 3, 2010 (WO) .................. PCT/IL2010/000631

(51) Int. Cl.
*G05B 11/01* (2006.01)

(52) U.S. Cl.
USPC .......................................................... 318/676

(58) Field of Classification Search
USPC ............. 439/107, 487, 535, 74, 76, 620, 651, 439/525, 676
See application file for complete search history.

(56) References Cited

U.S. PATENT DOCUMENTS 3,493,915 A 2/1970 Cox
4,273,957 A 6/1981 Kolling, Jr.
5,281,154 A * 1/1994 Comerci et al. .............. 439/107
5,967,815 A * 10/1999 Schlessinger et al. ........ 439/188
6,220,880 B1 4/2001 Lee et al.
7,153,168 B2 * 12/2006 Caveney et al. .............. 439/676
7,780,470 B2 * 8/2010 Benoit et al. .................. 439/535
8,267,719 B1 * 9/2012 Benoit et al. .................. 439/535

FOREIGN PATENT DOCUMENTS

EP 1076348 2/2001

OTHER PUBLICATIONS

Jones D: "PCB Design Tutorial", 20040629, [Online] No. Revision A, Jun. 29, 2004, pp. 1-25, XP007915904, Tables on pp. 7 and 9.

* cited by examiner

*Primary Examiner* — Tulsidas C Patel
*Assistant Examiner* — Phuongchi T Nguyen

(57) ABSTRACT

A modular electric socket assembly comprises a male plug unit electrically connected to a cover plate member having at least one electric socket, and a female plug unit retained in a wall and electrically connected to an electric supply system. Pins of the male plug unit are coupleable with corresponding cavities of the female plug unit. In one embodiment, the socket assembly is a strip assembly having a panel on which are printed a plurality of conductive elements, a cover plate member having at least two socket regions and attached to the panel, and a male plug unit interconnected with the panel. The conductive elements are arranged so as to connect in electrically conductable alignment a user device coupled to a selected socket region, each contact of the panel associated with the selected socket region, conductors associated with the male plug unit, and conductors associated with the female plug unit.

16 Claims, 12 Drawing Sheets

A–A

MODULAR ELECTRIC SOCKET ASSEMBLY AND ASSEMBLY METHOD THEREOF

FIELD OF THE INVENTION

The present invention relates to the field of electric connectors. More particularly, the invention relates to a modular electric socket assembly and a method with use of the same.

CROSS-REFERENCE TO RELATED APPLICATIONS

The present application claims priority to International Patent Application No. PCT/IL2010/000631 (PCT Publication No. WO2011/016036), filed Aug. 3, 2010, and entitled "MODULAR ELECTRIC SOCKET ASSEMBLY AND ASSEMBLY METHOD THEREOF", which claims priority to Israeli Application No. 200209, filed Aug. 3, 2009, the disclosures of which are incorporated herein by reference in their entireties.

BACKGROUND OF THE INVENTION

The installation of electrical sockets, including wall sockets and sockets for light sources and ceiling fans, is an inconvenient and difficult task, particularly when the electrical device to be mated with the socket, e.g. a chandelier, is of a heavy weight that jeopardizes the safety of the installer.

The electrical infrastructure conductors, i.e. the live conductor, neutral conductor, and ground conductor extending from an electrical supply system, have to be accurately connected to designated terminals associated with the socket. The socket will not deliver current to the electrical device mated therewith, and may even present a safety hazard, if the conductor connections are not properly made. The difficulty of installation is exacerbated when it is desired to install a power strip provided with a plurality of sockets and a correspondingly increased number of conductors, each of which may be differently arranged or configured. The installer also has to ensure that the circuit breaker associated with the socket is closed, to avoid electrocution when connecting the live conductor.

It is an object of the present invention to provide a modular electric socket assembly for delivering high voltage current to a domestic or an industrial electrical device that facilitates speedy and accurate installation.

It is an additional object of the present invention to provide a modular electric socket assembly that can be assembled without risk of a safety hazard.

Other objects and advantages of the invention will become apparent as the description proceeds.

SUMMARY OF THE INVENTION

The present invention provides a modular electric socket assembly, comprising a male plug unit factory connected electrically to a cover plate member having at least one electric socket, and a female plug unit retained in a wall of a building and electrically connected to an electric supply system, pins of said male plug unit being coupleable with corresponding cavities of said female plug unit.

The socket assembly preferably further comprises one-way mating means for ensuring that a plurality of conductors associated with the male plug unit will be in electrically conductable alignment with the plurality of conductors associated with the female plug unit, respectively. By virtue of its modularity and of the one-way mating means, the electric socket assembly of the present invention can be assembled significantly quicker than with respect to prior art sockets assemblies, up to one-tenth of the time.

As an additional safety precaution, each conductor associated with the female plug unit is applied to a wall of a corresponding pin receiving cavity and is spaced by a selected distance from an exterior face of the female plug unit, to prevent electrical contact with a finger inserted in said corresponding pin receiving cavity. Accordingly, an assembler need not be an experienced electrician. The male plug unit may be coupled with the female plug unit even when current is flowing from the electrical supply system to the female plug unit and an associated circuit breaker has not been closed.

In one aspect, the socket assembly may be configured such that the pins of the male plug unit will be electrically connected with the corresponding conductors of the female plug unit only if each pin of the male plug unit is inserted to a greatest extent within a corresponding cavity of the female plug unit.

In one aspect, the cover plate member comprises a socket region member provided with a plurality of grooves for the insertion therein of blades of an electric device operable by means of electricity delivered by the socket assembly and with a contact associated with, and aligned with an electrically activatable region of, said plurality of grooves, each of a plurality of conductors associated with the male plug unit being connected in electrically conductable alignment with a corresponding contact.

In one aspect, the cover plate member comprises a cover plate and a light switch which is pivotally mounted within said cover plate, contacts of said light switch being connected in electrically conductable alignment with a corresponding conductor associated with the male plug unit.

In one embodiment, the socket assembly is a power strip assembly comprising a base unit and a cover plate member having at least two socket regions and attached to said base unit, the male plug unit being interconnected with said base unit.

The base unit is preferably a panel on which are printed a plurality of conductive elements, said plurality of conductive elements being arranged so as to connect in electrically conductable alignment each contact with a corresponding conductor associated with the male plug unit. The panel is printed with a number of sets of conductive elements which corresponds to the number of socket regions with which the power strip assembly is provided and each of said sets of conductive elements is able to deliver electricity in parallel to an electric device coupled to a corresponding socket region.

A minimum gap between adjacent conductive elements is at least 0.2 mm, whereby to prevent generation of electric discharge when the socket assembly delivers voltage of 115 VAC or 220 VAC to an electric device. The panel is preferably made of a material that is electrically insulated and thermally conductive in order to maximize heat dissipation.

In one aspect, each printed conductive element has a minimum cross-sectional area of approximately 1 $mm^2$ and a maximum resistance of approximately 0.016Ω/m when 10 A current is being delivered through the power strip assembly.

In one aspect, a plurality of pin insertion holes to a wall of each of which conductive material is applied are formed in the panel, one or more conductive elements extending in electrically conductable alignment from each contact to one of said plurality of pin insertion holes. A first electrically conductable end of a two-ended pin is insertable in, and in electric conducting relation with, each of the plurality of pin insertion holes. A second electrically conductable end of the two-ended pin is adapted to be seated in a corresponding aperture of the male plug unit so as to be in electrically conductable alignment with a corresponding conductor associated with the male plug unit.

In one aspect, the first electrically conductable end of a two-ended pin is also in electric conducting relation with a corresponding contact.

In one aspect, a plurality of via holes are formed in the panel, each of said via holes conductably interfacing with a conductive element printed on a first face of the panel and with a conductive element printed on a second face of the panel.

In one aspect, the cover plate member also has a light switch region and additional conductive elements for connecting in electrically conductable alignment each contact of said light switch with a corresponding conductor associated with the male plug unit.

In one aspect, the panel is also printed with suitable circuitry for the activation and operation of one or more electronic devices.

In one aspect, the cover plate member comprises one or more detachable socket region members, each of said socket region members being formed with a plurality of grooves for insertion therein of blades of an electrical device.

In one aspect, a socket region member is detachable from a first area of the cover plate member and is reattachable to a second area of the cover plate member.

In one aspect, a first socket region member detached from the cover plate member is replaceable by a first socket region member having a groove arrangement different from that of said first socket region member, electricity being safely deliverable to both a first electrical device coupled with said first socket region member and to a second electrical device coupled with said second socket region member.

In one aspect, the male plug unit and the female plug unit are configured with a dedicated housing member having a spring terminal unit.

In one aspect, the female plug unit is recessed from an outer surface of the wall in which it is retained.

The present invention is also directed to a modular electric strip assembly, comprising a panel on which are printed a plurality of conductive elements; a cover plate member having at least two socket regions and attached to said panel;

a male plug unit interconnected with said panel; and a female plug unit retained in a wall of a building and electrically connected to an electrical infrastructure, pins of said male plug unit being coupleable with corresponding cavities of said female plug unit. Said plurality of conductive elements are arranged so as to connect in electrically conductable alignment a user device coupled to a selected socket region, each contact of said panel which is associated with said selected socket region, corresponding conductors associated with the male plug unit, and corresponding conductors associated with the female plug unit.

In one aspect, the electrical infrastructure is an electrical supply system and each socket region is formed with a plurality of grooves for the insertion therein of blades of an electrical device.

In one aspect, the electrical infrastructure is a telephonic or communication infrastructure for transmitting information to a user device coupled to a socket region.

The present invention is also directed to a method for assembling an electric socket assembly, comprising the steps of:

a) connecting in electrically conductable alignment conductors of a female plug unit with wired connections of an electrical infrastructure and retaining said female plug unit within a wall of a building;
b) providing a panel on which are printed a plurality of conductive elements and which is formed with a plurality of contacts each of which is electrically connected with one or more of said conductive elements;
c) selecting a cover plate member having a desired number of socket regions wherein each socket region has a desired configuration;
d) attaching said cover plate member to said panel whereby a set of said contacts is positioned in an electrically activatable region of each of said desired number of socket regions;
e) interconnecting in electrically conductable alignment a male plug unit with said panel; and
f) in one motion, aligningly coupling said male plug unit with said female plug unit.

DETAILED DESCRIPTION OF PREFERRED EMBODIMENTS

The present invention is a modular electric socket assembly that can be assembled quicker, more safely, and more reliably than prior art electric socket assemblies. As a result of these advantages, considerable savings to the resident of a dwelling may be realized as a certified electrician need not assemble the socket assembly.

Figure 1:
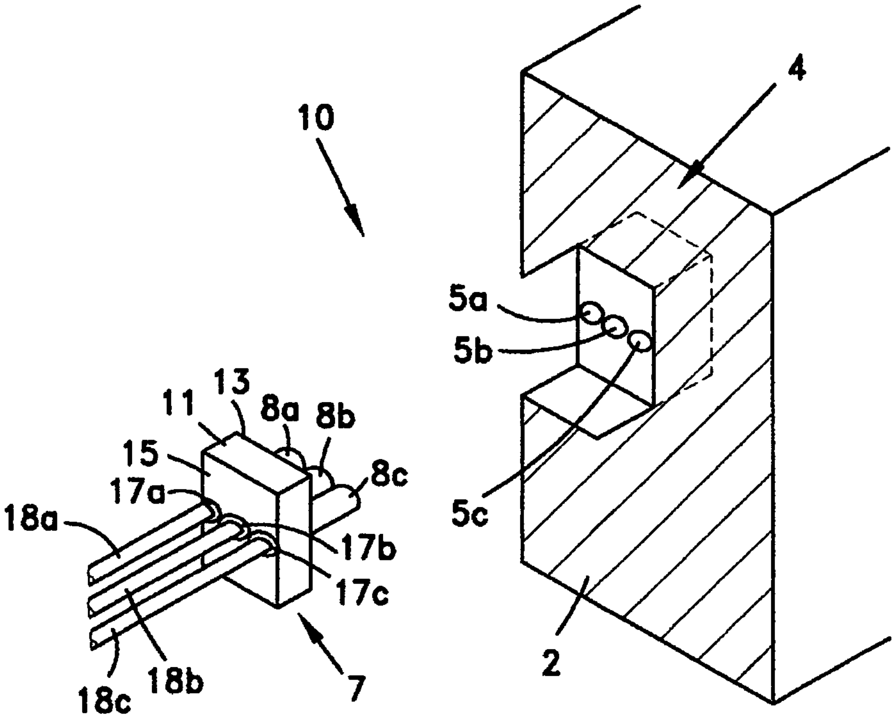
FIG. 1 is a perspective view in exploded form of a portion of a modular electric socket assembly, according to one embodiment of the present invention.

FIG. 1 illustrates a portion of a modular electric socket assembly, generally indicated by numeral 10, according to one embodiment of the present invention. Socket assembly 10 comprises a female plug unit 4 mounted by a contractor in, and recessed from the surface of, a wall 2 of a building, and a male plug unit 7, which is factory connected to the contacts of a socket cover plate and is insertable into female plug unit 4.

Male plug unit 7 has three protruding conductive elements (hereinafter "pins") 8*a-c* that protrude from the rear face 13 of a coupler 11, e.g. having a rectilinear configuration. Pins 8*a-c* are sized to be inserted within cavities 5*a-c*, respectively, formed in female plug unit 4 and to thereby be placed in electrical connection with a corresponding conductive element provided in each cavity. Within the front face 15 of coupler 11 are formed three cavities 17*a-c*, which may be concentric with pins 8*a-c*, respectively, and onto the inner wall of which is applied, e.g. by electroplating, conductive material in contact with a corresponding pin. Conductors 18*a-c* connected to the live, neutral, and ground contacts, respectively, of a socket cover plate are insertable within cavities 17*a-c*, respectively, so as to be electrically interconnected with pins 8*a-c*, respectively.

When male plug unit 7 is connected to the socket cover plate, such as following a factory installation operation, socket assembly 10 may therefore be easily, speedily, and accurately assembled, being capable of safely and reliably delivering high voltage current to a domestic or an industrial electrical device coupled to the socket assembly, by inserting pins 8*a-c* into cavities 5*a-c* of female plug unit 4 without risk of improper conductor connections or short circuiting. Since male plug unit 7 is not connected to the electrical supply system during a socket assembly operation, the assembler advantageously does not suffer any risk of electrocution if he contacts one of the pins 8*a-c*.

Figure 2:
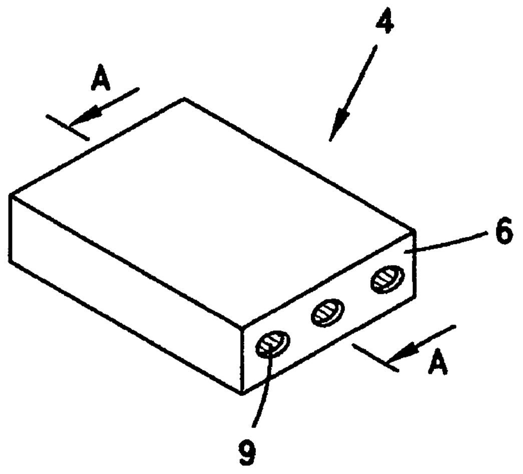
FIG. 2 is a perspective, schematic view of a female plug unit, showing a conductive element applied to a wall of each pin receiving cavity thereof.
Figure 3:
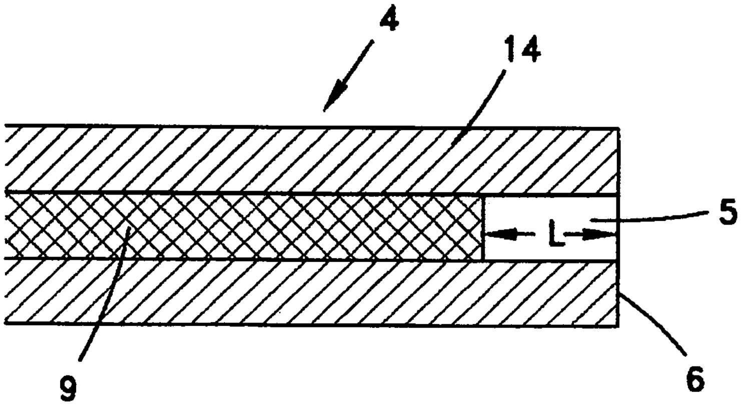
FIG. 3 is a cross sectional view of the female plug unit of FIG. 2, cut about plane A-A.

As an additional safety measure, as shown in FIGS. 2 and 3, a conductive element 9 applied to the wall 14 of each pin receiving cavity 5 is spaced by a distance L from front face 6 of female plug unit 4. The socket assembly may be configured such that a pin will be electrically connected with conductive element 9 only if it is inserted to a greatest extent within cavity 5. Distance L is sufficiently long to prevent a finger from contacting conductive element 9, and thereby preventing electrocution, if inserted within cavity 5. Accordingly, the electric socket assembly of the present invention may be advantageously assembled even when an associated circuit breaker has not been closed and current is flowing through conductive element 9 from the electric supply system.

Reliable socket assembly may be ensured by configuring male plug unit 7 with means for ensuring one-way mating with female plug unit 4.

Figure 4:
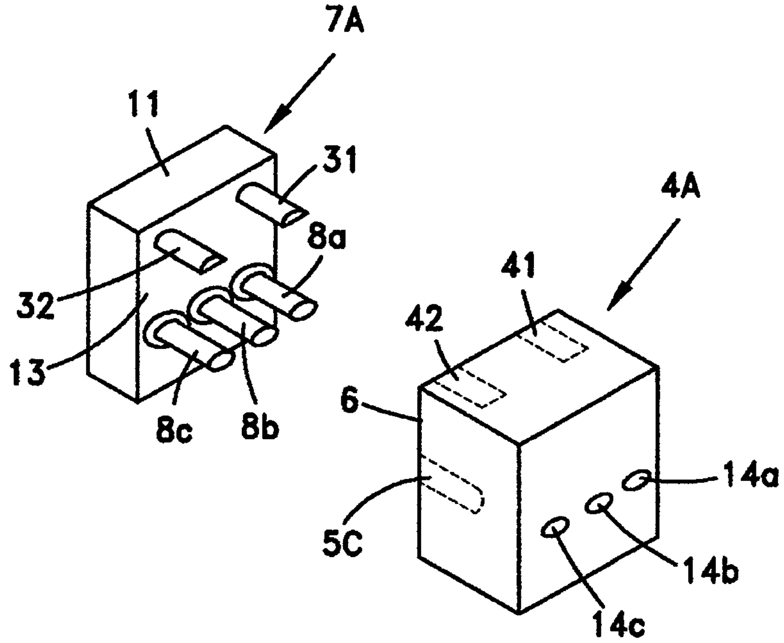
FIG. 4 is a perspective view in exploded form of a portion of a modular electric socket assembly according to another embodiment of the present invention, showing one-way mating means.

In one embodiment of one-way mating means shown in FIG. 4, male plug unit 7A is provided with guide elements 31 and 32 that extend from rear face 13 of coupler 11 and are configured differently than pins 8*a-c*. Female plug unit 4A is accordingly formed with cavities 41 and 42, which are shaped complementarily to, and located at the same corresponding relative location as, guide elements 31 and 32, respectively, in addition to cavities 5*a-c* which are shaped complementarily to pins 8*a-c*, respectively. By virtue of the guide elements, male plug unit 7A can be mated with female plug unit 4A in only one way to prevent a pin from being coupled inadvertently to an incorrect conductive element of a female plug unit cavity, leading to a short circuit, an overload or, more dangerously, shock or electrocution if a live conductor is connected to a ground conductor of an electric appliance.

For example, pins 8*a-c* are cylindrical, and guide elements 31 and 32 located above the pins are semicylindrical and shorter than the pins. When male plug unit 7A is correctly oriented, guide elements 31 and 32 are receivable in cavities 41 and 42, respectively, and pins 8*a-c* are receivable in cavities 5*a-c*, respectively, allowing rear face 13 of. male plug unit 7A to contact front face 6 of female plug unit 4A. However, if male plug unit 7A is incorrectly oriented, a guide element will contact female plug unit front face 6 and will prevent further insertion of the incorrectly aligned pin.

Alternative one-way mating means may include pins and cavities of different size or unevenly spaced pins and cavities.

Figure 5:
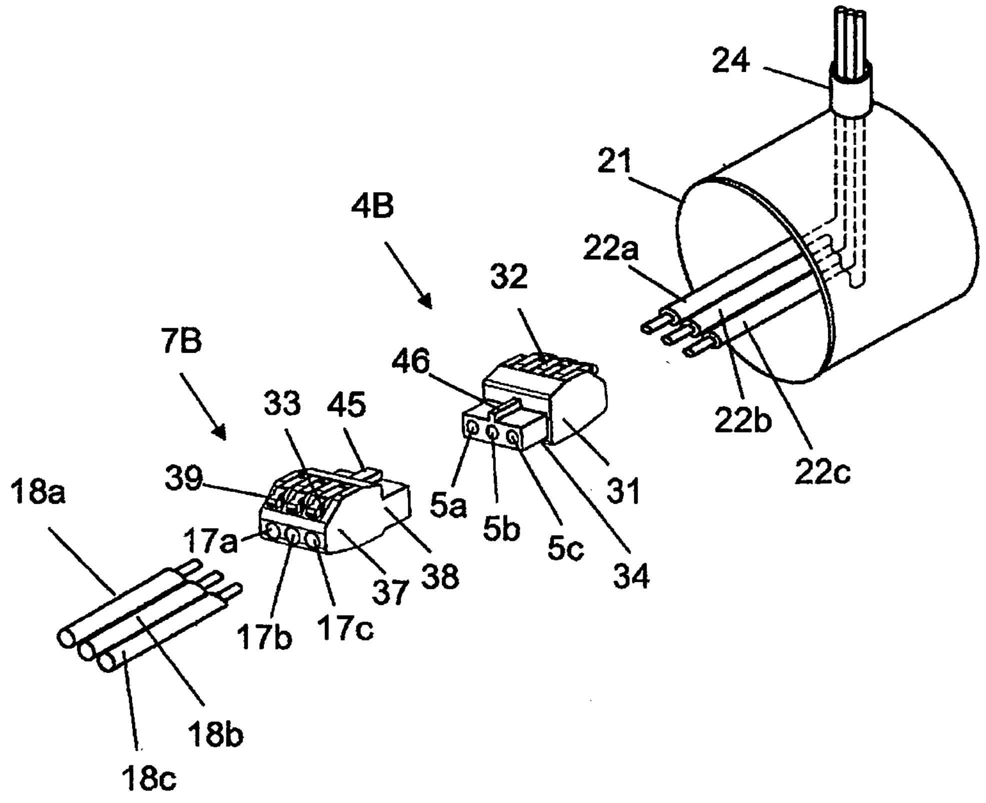
FIG. 5 is a perspective view in exploded form of a portion of a modular electric socket assembly, according to another embodiment of the present invention.

In the embodiment shown in FIG. 5, female plug unit 4B and male plug unit 7B are configured with dedicated housing members, e.g. made of plastic, to simplify the coupling of the conductors.

Housing member 31 of female plug unit 4B is positioned within cylindrical electrical box 21, and spring terminal unit 32 thereof is formed with cavities, e.g. similar to cavities 14*a-c* (FIG. 2), for coupling with conductors 22*a-c*, respectively. Live conductor 22*a*, neutral conductor 22*b*, and ground conductor 22*c* are connected to an electrical supply system and fed through vertically extending sleeve 24, only a portion of which being shown. Forwardly of spring terminal unit 32 is female mating section 34 formed with cavities 5*a-c*.

Housing member 37 of male plug unit 7B also has a spring terminal unit 39 formed with cavities 17*a-c* for coupling with conductors 18*a-c*, respectively, which are factory connected to the contacts of a socket cover plate. Rearwardly of spring terminal unit 39 is male mating section 38, a rectangular enclosure in which are housed pins 8*a-c* (FIG. 1). Male mating section 38 is adapted to slide over female mating section 34, and is configured, when fully extended over female section 34, to cause pins 8*a-c* to become engaged with the conductive element provided in cavities 5*a-c*, respectively. Guide elements 45 and 46, e.g. rectangular, protruding from the male and female sections, respectively, serve as one-way mating means and may be used to direct each pin into a corresponding cavity.

A spring biased lever 33 is provided for each conductor receiving cavity of spring terminal units 32 and 39, and is used to quickly effect engagement of the conductor with a conductive element without need of any tools. Conductors 22*a-c* are usually provided with some curvature so that they can be extended from electrical box 21 during an assembly operation without being overly tensioned, and are coupled with terminal unit 32 before female plug unit 4B is mated with male plug unit 7B.

Figure 6:
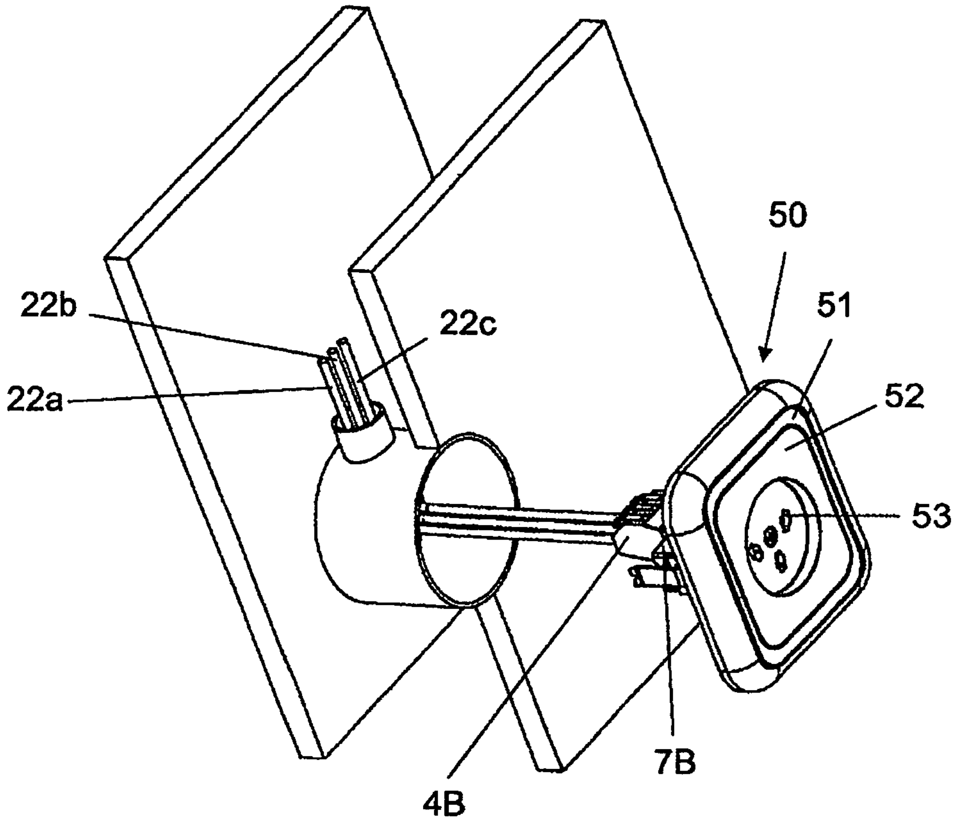
FIGS. 6 and 7 are a perspective view in exploded form two embodiments, respectively, of a modular electric socket assembly.

Male plug unit 7B is electrically connected to cover plate 51 of socket assembly 50 shown in FIG. 6. Cover plate 51 may be formed integrally with outlet member 52 provided with three grooves 53, e.g. formed in a depression which is recessed from the outer surface of outlet member 52, for receiving the blades of an electric device. The contact associated with each groove 53 is connected in correct alignment to a corresponding conductor of male plug unit 7B, so that when female plug unit 4B is coupled to male plug unit 7B the conductors 22*a-c* will deliver electricity with the correct polarity to the electric device coupled to socket assembly 50.

Figure 7:
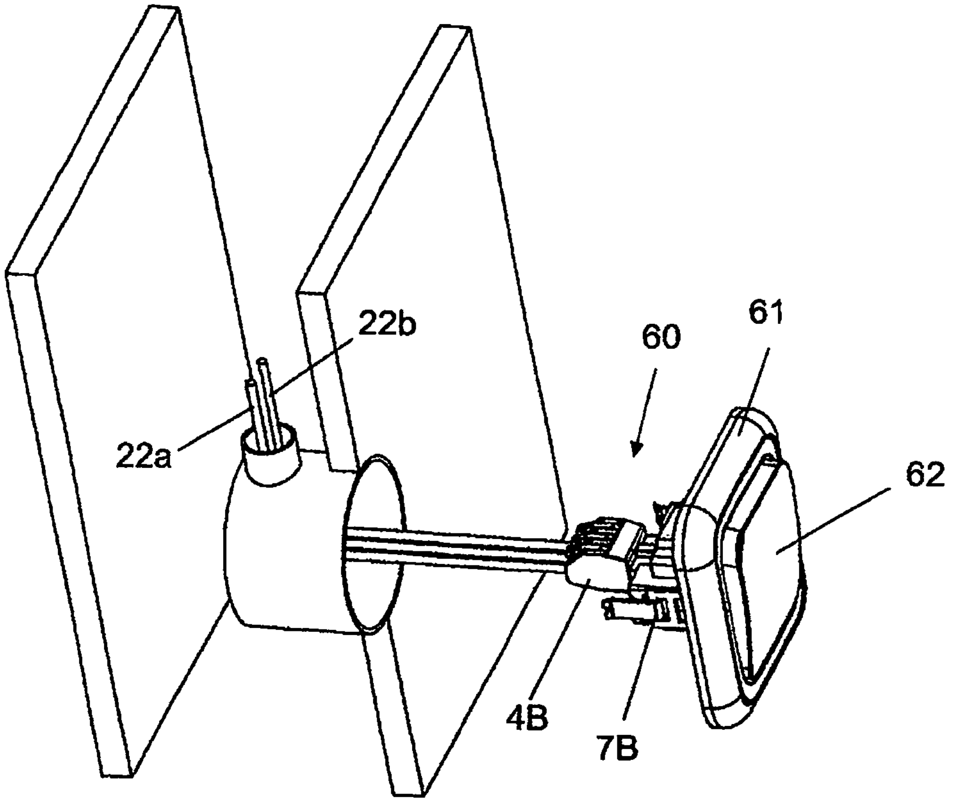

FIG. 7 illustrates a modular socket assembly 60 for a light switch 62. The contacts of light switch 62, which is pivotally mounted within cover plate 61, are electrically connected in correct alignment to a corresponding conductor of male plug unit 7B, so that when female plug unit 4B is coupled to male plug unit 7B the conductors 22*a-b*, excluding of course the ground connector, will deliver electricity with the correct polarity to the electric device coupled to socket assembly 60.

It will be appreciated that any other customized socket assembly that can be quickly and accurately assembled may be provided for delivering electricity to a desired domestic or an industrial electrical device.

FIGS. 8A-D illustrate another embodiment of the invention wherein the modular socket assembly is for use in a power strip. As referred to herein, a "strip" is an assembly normally but not necessarily in strip form that includes sockets for two or more electrical devices, such as a duplex outlet, and may further comprise one or more activation devices or switches, an internal surge protector, standby mode circuitry, and an internal circuit breaker. When the strip is a "power strip", it is used to deliver electricity from an electrical supply system, e.g. of 115 or 220 VAC.

Figure 8A:
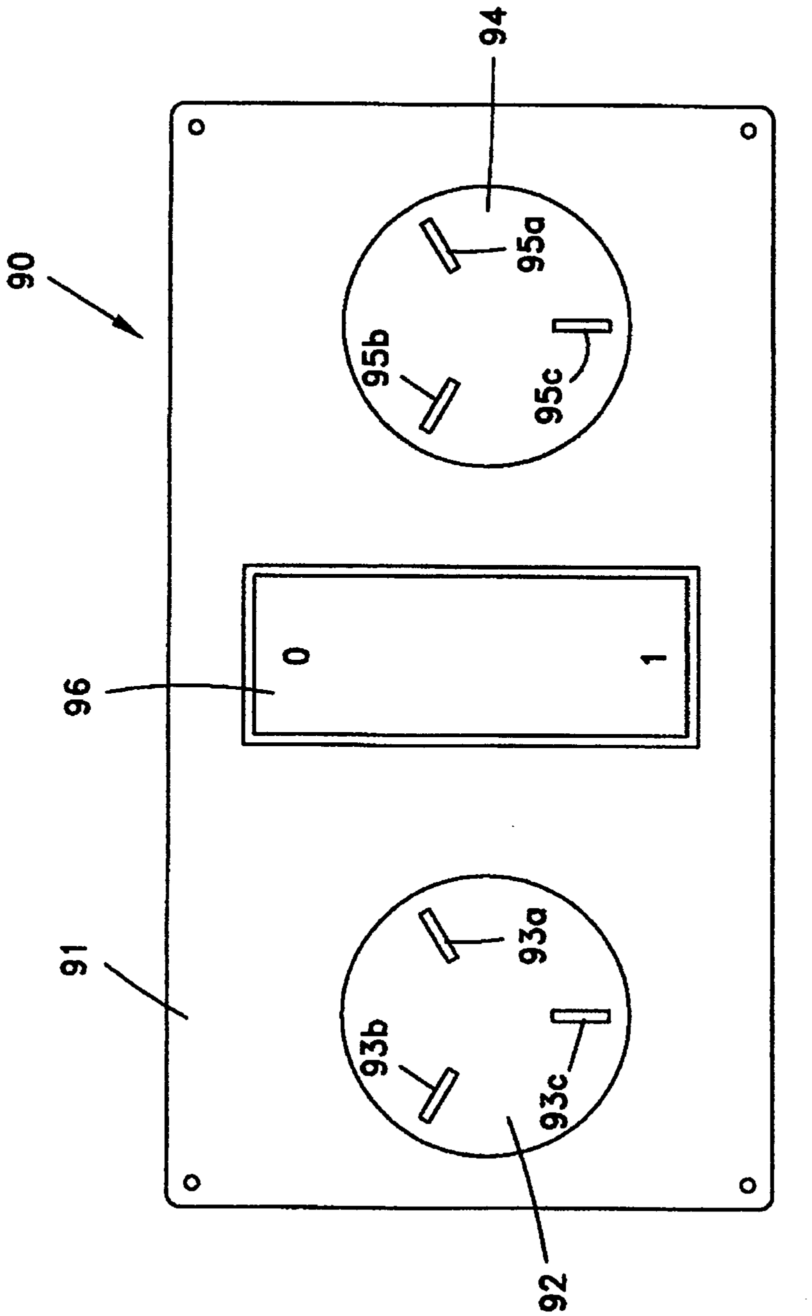
FIG. 8A is a front view of a cover plate of a power strip.

A typical power strip 90 is shown in FIG. 8A. Power strip 90 is provided with two sockets 92 and 94, socket 92 having grooves 93*a-c* and socket 94 having grooves 95*a-c* for the insertion therein of the blades of an electrical device. Pivoting light switch 96 is interposed between sockets 92 and 94. A cover plate 91 is adapted to be connected to a base structural unit.

Figure 8B:
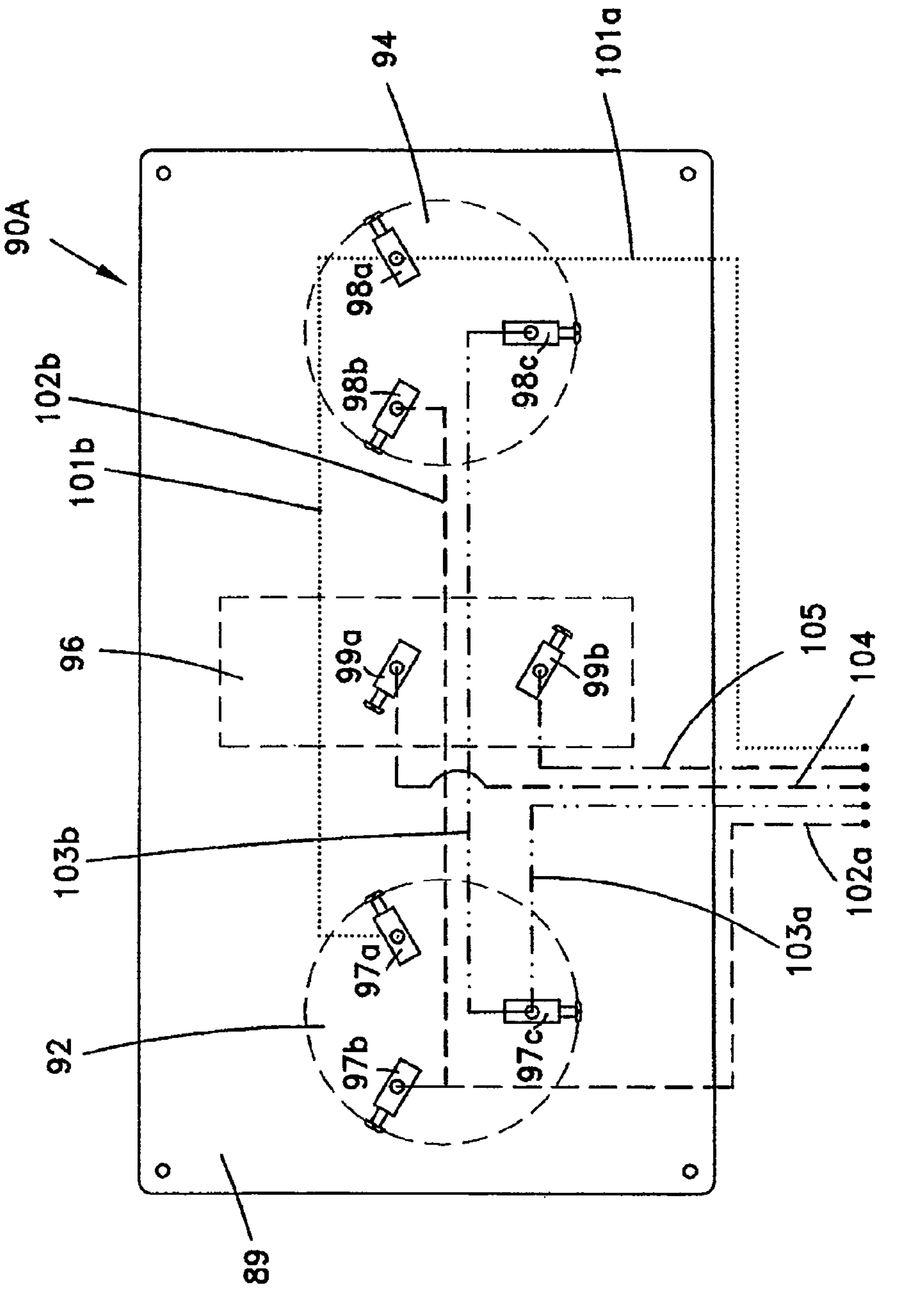
Fig. 8B Prior Art
FIG. 8B is a front view of the wiring connection of a prior art power strip while the metal connectors are removed.

In order to appreciate the utility of the modular power strip of the present invention, reference is first made to FIG. 8B, which illustrates the wiring connection of a prior art power strip while the metal connectors are removed for clarity. Dashed representations of sockets 92 and 94 and of light switch 96 are provided in FIGS. 8B-D for purposes of clarity.

In a power strip 90A of the prior art mounted in base unit 89, contacts 97*a-c* aligned with grooves 93*a-c* are provided in the region of socket 92, contacts 98*a-c* aligned with grooves 95*a-c* are provided in the region of socket 94, and contacts 99*a-b* are provided in the region of light switch 96. Contacts 97*a* and 98*a* are interconnected by live wires 101*a-b*, contacts 97*b* and 98*b* are interconnected by neutral wires 102*a-b*, and contacts 97*c* and 98*c* are interconnected by ground wires 103*a-b*. In addition to the interconnected wires for the sockets, live wire 104 and neutral wire 105 connected to light switch contacts 99*a* and 99*b*, respectively, are also provided. The end of wires 101*a*, 102*a*, 103*a*, 104 and 105 are connected to the electric supply system while being fed for example through a vertically extending sleeve.

Due to the large number of wired connections, an electrician assembling the power strip is liable to incorrectly interconnect a set of contacts or to connect a contact to an incorrect type of wire. Following an incorrect wired connection, an electrical failure such as a short circuit, an overload or electrocution will result when an electrical device is coupled to a socket having an incorrectly wired connection and activated, or when a switch having an incorrectly wired connection is depressed to allow electricity to be delivered to an electric device.

Figure 8C:
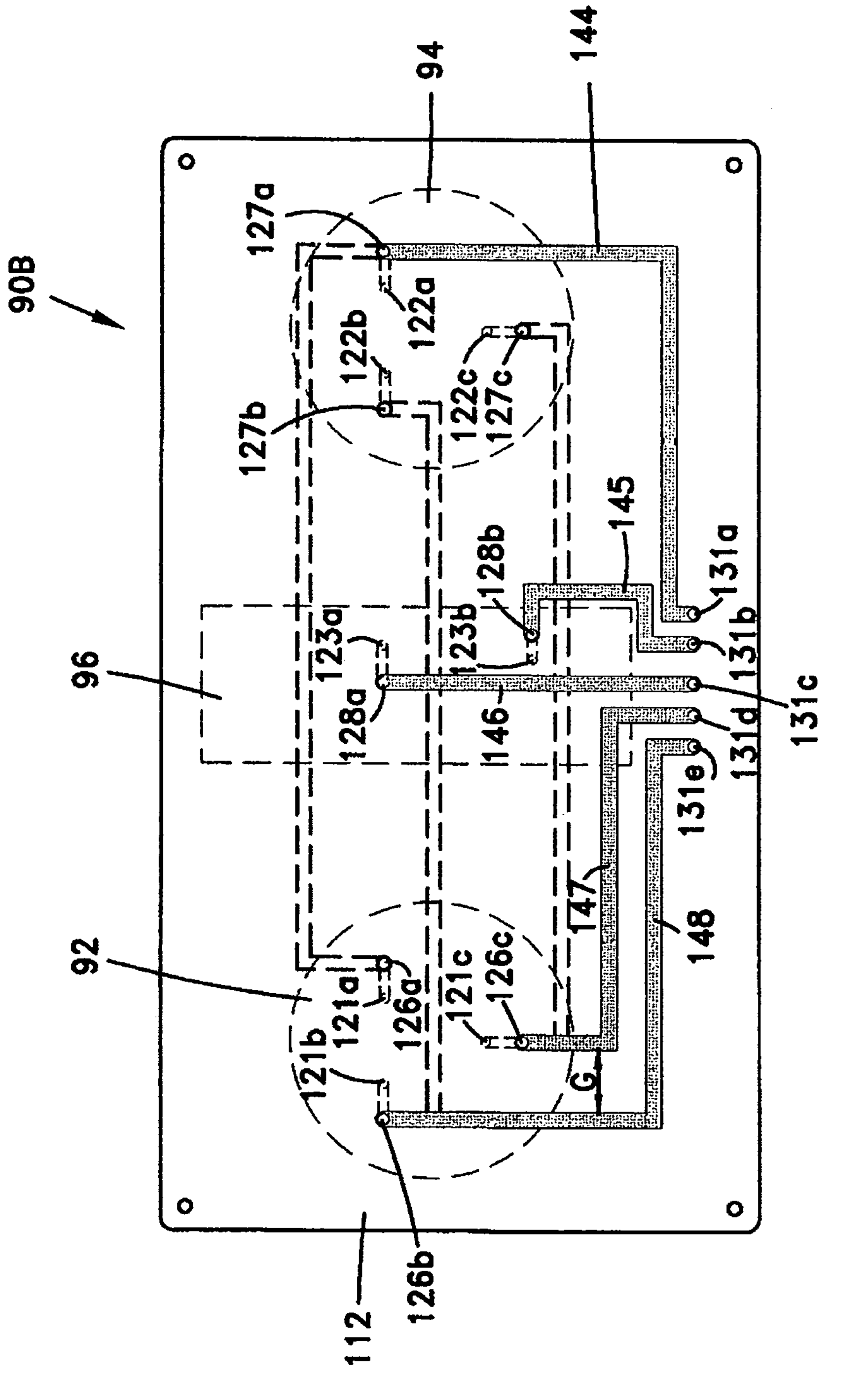
FIG. 8C is a rear view of a panel of a power strip assembly according to one embodiment of the present invention which is printed with a plurality of conductive elements.
Figure 8D:
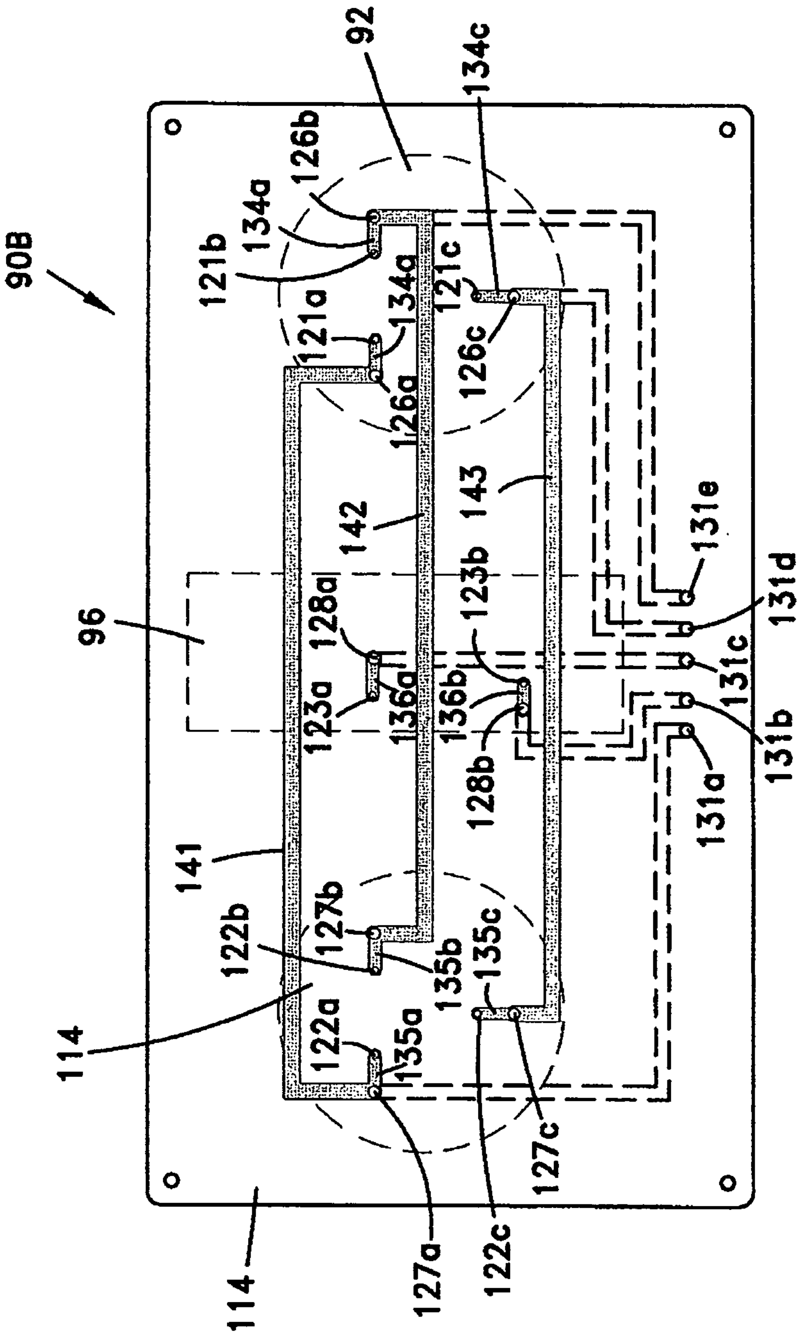
FIG. 8D is a front view of the panel of FIG. 8C.

FIGS. 8C and 8D illustrate an exemplary power strip panel 90B of the present invention. In order to reduce assembly time and to increase reliability and safety, power strip panel 90B is advantageously provided with a plurality of preprinted conductive elements, e.g. made of copper, which connect the various contacts. Wired connections no longer need to be made in situ. Since the assembler need not be concerned with incorrect wired connections due to the high reliability of the printed circuit power strip panel, the assembler may be unskilled and simply couple panel 90B to a plug unit, as will be described hereinafter, without risk of an electrical failure. FIG. 8C illustrates rear face 112 of panel 90B while FIG. 8D illustrates front face 114 thereof. The printed conductive elements that are visible on the given panel face are indicated by gray striping, while those applied on the other face are indicated by dashed lines.

Contact holes 121*a-c* are provided at socket region 92, contact holes 122*a-c* are provided at socket region 94, and contact holes 123*a-b* are provided at light switch region 96. One of through holes 126*a-c*, 127*a-c*, and 128*a-b*, also called via holes, is provided proximate to a corresponding contact hole to allow current to flow continuously to the other face of panel 90B. Pin insertion holes 131*a-e* are also formed in panel 90B, for the insertion in each of which a pin to be coupled with a plug unit. Each via and pin insertion hole has a wall to which is applied conductive material such as by electroplating.

Conductive elements 134*a-c*, 135*a-c*, and 136*a-b* printed on front face 114 connect contact holes 121*a-c*, 122*a-c*, and 123*a-b*, respectively, with via holes 126*a-c*, 127*a-c*, and 128*a-b*, respectively. Via holes 126*a* and 127*a* are interconnected by conductive element 141, via holes 126*b* and 127*b* are interconnected by conductive element 142, and via holes 126*c* and 127*c* are interconnected by conductive element 143, all of which are printed on front face 114. On rear face 112 are printed conductive element 144 connecting via hole 127*a* with pin insertion hole 131*a*, conductive element 145 connecting via hole 128*b* with pin insertion hole 131*b*, conductive element 146 connecting via hole 128*a* with pin insertion hole 131*c*, conductive element 147 connecting via hole 126*c* with pin insertion hole 131*d*, and conductive element 148 connecting via hole 126*b* with pin insertion hole 131*e*. In this fashion, all conductive elements are in correct alignment and none of which are in contact with an adjacent conductive element, allowing electricity to be reliably delivered from the electrical supply system to each electric device coupled to the power strip.

In contrast to conventional printed circuit devices for electronic devices having a rated current range of approximately 1-100 mA, the power strip of the present invention delivers electricity from an electric supply system and is therefore subjected to current on the order of 10 A. To obviate the concern of the generation of electric discharge between adjacent conductive elements of the printed circuit power strip panel if they become excessively heated and have an excessively high power consumption, each pair of adjacent conductive elements of power strip panel 90B are arranged with a minimum gap G of at least 0.2 mm therebetween. Accordingly, a power strip assembly is able to deliver high-current electricity to an electric device that is coupled thereto, e.g. an electric heater, while the printed conductive elements are able to withstand the flow of high current without being excessively heated. For example, each copper conductive element has a minimum cross-sectional area of 1 $mm^2$ and a maximum resistance of 0.016Ω/m when 10 A current is being delivered therethrough. Power strip panel 90B may be made of a material that is electrically insulated and thermally conductive to maximize heat dissipation.

Figure 9:
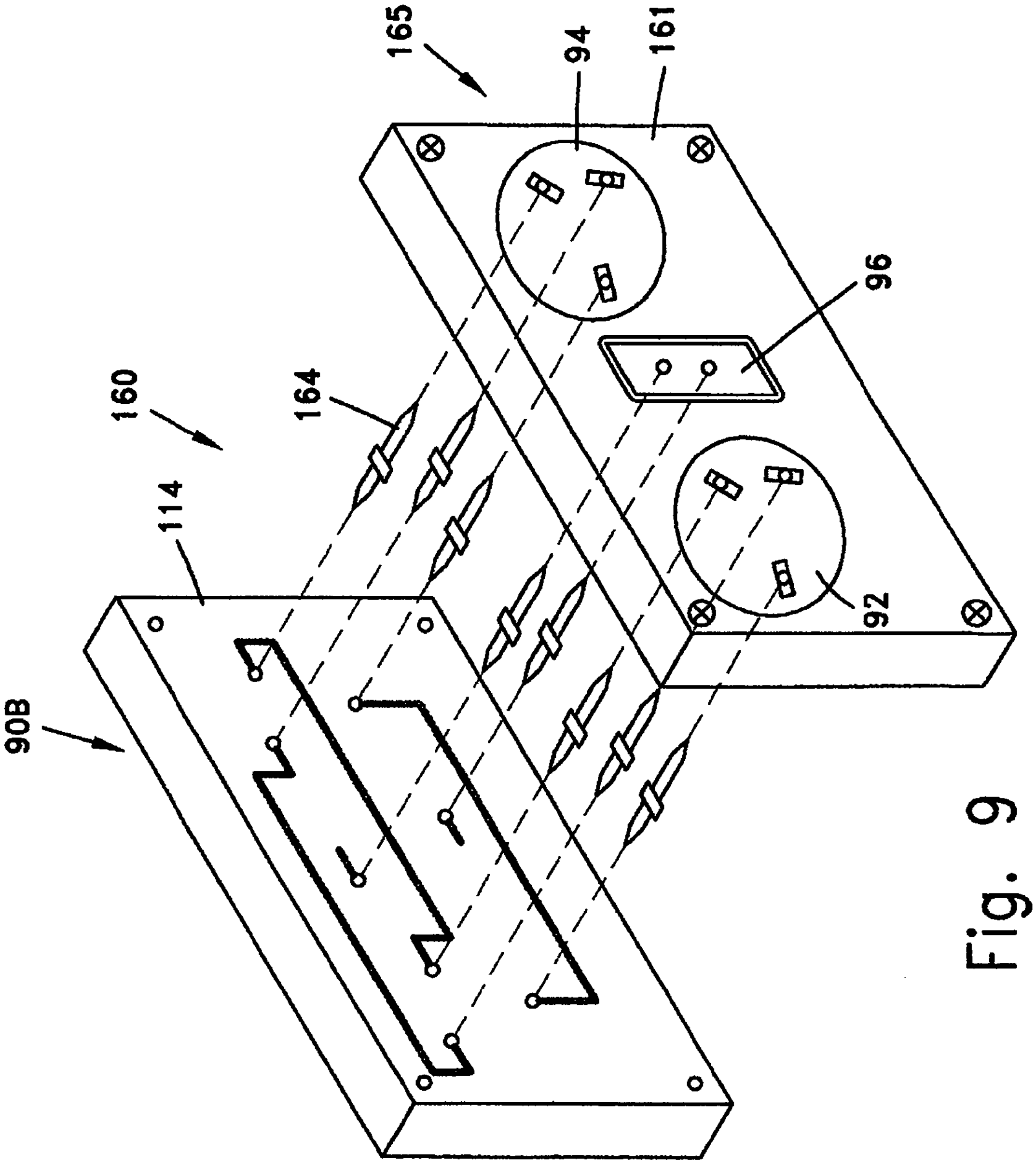
FIG. 9 is a perspective view in exploded form of a cover plate member being interconnected with the panel of FIG. 8C.
Figure 10:
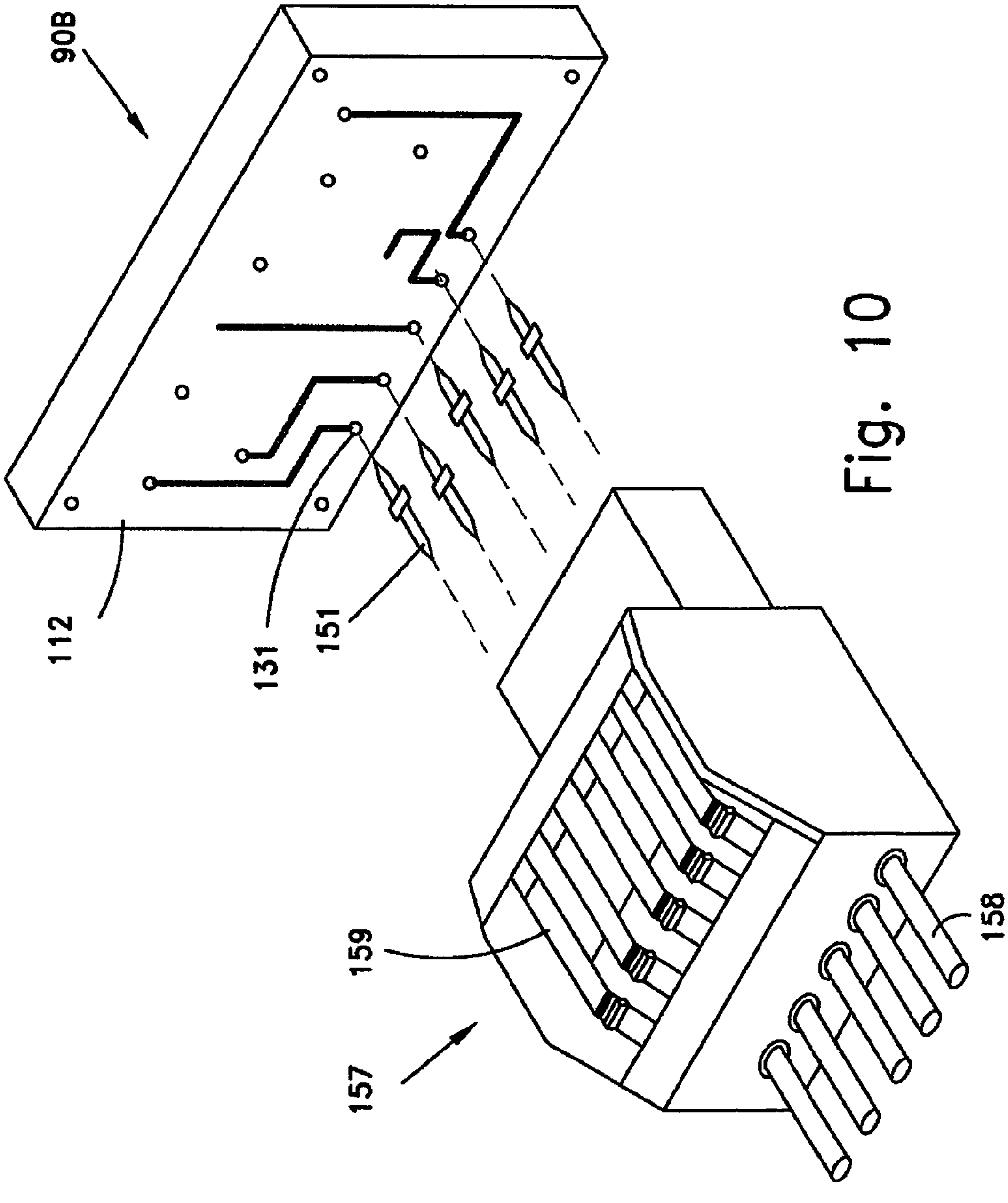
FIG. 10 is a perspective view in exploded form of a male plug unit being interconnected with the panel of FIG. 8C.

As shown in FIGS. 9 and 10, a power strip assembly 160 is a unitary factory installed assembly that comprises cover plate member 165 provided with cover plate 161 for retaining socket regions 92 and 94 and light switch region 96, power strip panel 90B, and male plug unit 157. A plurality of two-ended contact pins 164 are provided for electrically connecting each contact hole on front face 114 of power strip panel 90B to an electrically activatable region of cover plate member 165, after one electrically conductable end of pin 164 has been seated in a corresponding contact hole. One electrically conductable end of each of a plurality of factory installed, two-ended plug conducting pins 151 is coupled to a corresponding pin insertion hole 131 formed in rear face 112 of power strip panel 90B. The second electrically conductable end of the five plug conducting pins 151 in turn are factory connected to male plug unit 157 by being inserted in corresponding cavities of the associated spring terminal unit 159. In order to assemble the socket assembly, an assembler simply couples the five pins 158 of male plug unit 157 into corresponding cavities of the female plug unit connected to the electric supply system.

It will be appreciated that the cover plate member may be provided with any other desired number of socket regions, insofar as the power strip panel is printed with a number of sets of conductive elements which corresponds to the number of socket regions and each set of conductive elements is able to deliver electricity in parallel to an electric device coupled thereto. The cover plate member may comprise one or more detachable socket region members. When a socket region member, which is formed with grooves for insertion therein of blades of an electrical device, is detached from a first area of the cover plate or from the power strip panel, the detached socket region member may be reattached to a second area of the cover plate member, to allow an electrical device not accessible to the first area to be coupled to the power strip assembly. By being able to detach a socket region member from the cover plate member, an assembler is advantageously able to customize the socket region member with a groove arrangement which corresponds with the blade arrangement of an electric device desired to be coupled to the power strip assembly, for example for use in a foreign country. Despite the different groove arrangement of two socket region members, a contact pin is able to be electrically connected to the electrically activatable region of a second socket region member after having been replaced with a first socket region member. Prior to detaching or attaching a socket region member, the male plug unit of the power strip assembly should be detached from the female plug unit with which it is coupled.

The power strip panel of the present invention may be additionally printed with suitable circuitry for the activation and operation of electronic devices needed for efficient usage of a power strip assembly, such as an internal surge protector, standby mode circuitry, and an internal circuit breaker.

The power strip assembly may be configured such that only one set of two-ended pins may be employed. In this configuration, each pin insertion hole is aligned with a corresponding electrically activatable region of the cover plate member while a necessary number of printed conductive elements for delivering electricity to each electric device coupled to the power strip assembly are provided.

If so desired, a socket assembly according to any of the embodiments described herein may be provided with a panel on which are printed conductive elements for delivering electricity to an electric device coupled therewith.

In another embodiment of the present invention, the socket assembly or strip assembly is used to deliver information, including voice information, data information, and video information from a telephonic or communication infrastructure to a user device. The infrastructure may comprise an interface device such as a network interface device (NID) for demarcating the interface between the network through which the information is transmitted and the wiring extending to the premises of the user. Another interface device may be an optical network terminal (ONT) for use when the information is transmitted by means of fiber optics whereby the ONT demultiplexes the transmitted information into different components, such as voice for telephone applications, television, and Internet, and further provides power for the user devices. The socket or strip assembly includes a male plug element coupled with a female plug unit which is retained in a wall. The male and female plug units are in aligned electrical connection with the wired connection of the interface device. Typical wired connections for telephone applications include a telephone line to a telephone cable, a telephone cable to a telephone base, a telephone base to a handset cable, and a handset cable to a handset.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A modular electric strip assembly, comprising:

a) a female plug unit retained in a wall of a building and electrically connected to an alternating current electrical supply system;

b) a panel on which are printed a plurality of conductive elements;

c) a cover plate member having at least two socket regions and attached to said panel, each of said at least two socket regions being provided with a plurality of grooves for the insertion therein of blades of an electrical device and with a contact associated and aligned with an electrically activatable region of said plurality of grooves; and d) a male plug unit interconnected with said panel, pins protruding from said male plug unit being coupleable with corresponding cavities of said female plug unit, characterized in that said pins protruding from said male plug unit are coupleable with corresponding cavities of said female plug unit by one-way mating means for ensuring that a plurality of conductors associated with said male plug unit will be in electrically conductable alignment with a plurality of conductors associated with said female plug unit, respectively, wherein said panel is an electronic device free panel for conducting electricity from said female plug unit to said male plug unit, wherein said panel is formed with a plurality of via holes, each of said via holes conductably interfacing with a first of said plurality of conductive elements which is printed on a first face of said panel and with a second of said plurality of conductive element which is printed on a second face of said panel, wherein said panel is further formed with a plurality of contact holes in said first face, each of said plurality of contact holes conductably interfacing with one of said first conductive elements, and with a plurality of pin insertion holes in said second face, each of said plurality of pin insertion holes conductably interfacing with one of said second conductive elements, to a wall of each of said plurality of contact holes and said plurality of pin insertion holes conductive material is applied, said strip assembly further comprising:

a. a plurality of two-ended electrically conductable contact pins, a first end of each of said plurality of contact pins being inserted in, and in electric conducting relation with, one of said contact holes and a second end of each of said plurality of contact pins being electrically connected to a corresponding electrically activatable region of said cover plate member; and b. a plurality of two-ended electrically conductable plug pins, a first end of each of said plurality of plug pins being inserted in, and in electric conducting relation with, one of said pin insertion holes and a second end of each of said plurality of contact pins being seated in a corresponding aperture of said male plug unit so as to be in electrically conductable alignment with a corresponding conductor associated with said male plug unit, wherein said plurality of conductive elements are arranged so as to connect in electrically conductable alignment an electrical device coupled to a selected socket region of said cover plate member, the contact pin which is associated with said selected socket region, corresponding conductors associated with said male plug unit, and corresponding conductors associated with said female plug unit, while preventing generation of electric discharge when said strip assembly delivers voltage of 115 VAC or 220 VAC and current of approximately 10 A from said electrical supply system to said device.

2. The strip assembly according to claim 1, wherein the cover plate member also has a light switch region and additional conductive elements for connecting in electrically conductable alignment each contact pin associated with said light switch region and a corresponding pin insertion hole.

3. The strip assembly according to claim 1, wherein the panel is made of a material that is electrically insulated and thermally conductive.

4. The strip assembly according to claim 1, wherein the male plug unit and the female plug unit are configured with a dedicated housing member having a spring terminal unit.

5. The strip assembly according to claim 1, wherein the female plug unit is recessed from an outer surface of the wall in which it is retained.

6. The strip assembly according to claim 1, wherein the cover plate member comprises a cover plate and a light switch which is pivotally mounted within said cover plate, contact pins of said light switch being connected in electrically conductable alignment with a corresponding conductor associated with the male plug unit.

7. The strip assembly according to claim 1, wherein the panel is printed with a number of sets of conductive elements which corresponds to the number of socket regions with which the power strip assembly is provided and each of said sets of conductive elements is able to deliver electricity in parallel to an electric device coupled to a corresponding socket region.

8. The strip assembly according to claim 1, wherein a minimum gap between adjacent conductive elements is at least 0.2 mm.

9. The strip assembly according to claim 8, wherein each printed conductive element has a minimum cross-sectional area of approximately 1 $mm^2$ and a maximum resistance of approximately 0.016Ω/m when 10 A current is being delivered through the power strip assembly.

10. The strip assembly according to claim 1, wherein each conductor associated with the female plug unit is applied to a wall of a corresponding pin receiving cavity and is spaced by a selected distance from an exterior face of the female plug unit, to prevent electrical contact with a finger inserted in said corresponding pin receiving cavity.

11. The strip assembly according to claim 10, which is configured such that the protruding pins of the male plug unit will be electrically connected with the corresponding conductors of the female plug unit only if each protruding pin of the male plug unit is inserted to a greatest extent within a corresponding cavity of the female plug unit.

12. The strip assembly according to claim 1, wherein the cover plate member comprises one or more detachable socket region members, each of said socket region members being formed with a plurality of grooves for insertion therein of blades of the electrical device.

13. The strip assembly according to claim 12, wherein a socket region member is detachable from a first area of the cover plate member and is reattachable to a second area of the cover plate member.

14. The strip assembly according to claim 12, wherein a first socket region member detached from the cover plate member is replaceable by a second socket region member having a groove arrangement different from that of said first socket region member, electricity being safely deliverable to both a first electrical device coupled with said first socket region member and to a second electrical device coupled with said second socket region member.

15. A method for assembling an electric socket assembly, comprising the steps of:

a) connecting in electrically conductable alignment conductors of a female plug unit with wired connections of an electrical infrastructure and retaining said female plug unit within a wall of a building;

b) providing a panel on which are printed a plurality of conductive elements and which is formed with a plurality of contacts each of which is electrically connected with one or more of said conductive elements;

c) selecting a cover plate member having a desired number of socket regions wherein each socket region has a desired configuration;

d) attaching said cover plate member to said panel whereby a set of said contacts is positioned in an electrically activatable region of each of said desired number of socket regions;

e) interconnecting in electrically conductable alignment a male plug unit with said panel; and f) in one motion, aligningly coupling said male plug unit with said female plug unit, characterized in that said step of attaching said cover plate member to said panel is carried out by inserting a first end of each of a plurality of two-ended electrically conductable contact pins in electric conducting relation with a corresponding contact hole formed in said panel and electrically connecting a second end of each of said plurality of contact pins with a corresponding electrically activatable region of said cover plate member, and said step of interconnecting in electrically conductable alignment said male plug unit with said panel is carried out by inserting a first end of each of a plurality of two-ended electrically conductable plug pins in electric conducting relation with a corresponding pin insertion hole formed in said panel and inserting a second end of each of said plurality of plug pins in electric conducting relation with a corresponding aperture of said male plug unit so as to be in electrically conductable alignment with a corresponding conductor associated with said male plug unit, wherein one or more of said plurality of printed conductive elements extend in electrically conductable alignment from one of said plurality of contact holes to one of said plurality of pin insertion holes, wherein said plurality of conductive elements are arranged so as to connect in electrically conductable alignment an electrical device coupled to a selected socket region of said cover plate member, the contact pin which is associated with said selected socket region, corresponding conductors associated with said male plug unit, and corresponding conductors associated with said female plug unit, while preventing generation of electric discharge when said socket assembly delivers voltage of 115 VAC or 220 VAC and current of approximately 10 A from said electrical infrastructure to said device.

16. The method according to claim 15, wherein the electrical infrastructure is an electrical supply system and the male plug unit is coupled with the female plug unit when current is flowing from the electrical supply system to the female plug unit.

* * * * *